(12) United States Patent
Schedivy (10) Patent No.: US 7,460,187 B2
(45) Date of Patent: Dec. 2, 2008

(54) RAIL SYSTEM FOR USE IN A VEHICLE

(75) Inventor: George C. Schedivy, Aquebogue, NY (US)

(73) Assignee: Audiovox Corporation, Hauppauge, NY (US)

(*) Notice: Subject to any disclaimer, the term of this patent is extended or adjusted under 35 U.S.C. 154(b) by 470 days.

(21) Appl. No.: 10/925,554

(22) Filed: Aug. 25, 2004

(65) Prior Publication Data

US 2006/0044481 A1    Mar. 2, 2006

(51) Int. Cl.
*H04N 5/64* (2006.01)
*H04N 7/18* (2006.01)

(52) U.S. Cl. .................. 348/837; 348/839; 348/844; 725/75

(58) Field of Classification Search ........... 348/837, 348/839, 844; 725/75; 296/37.8; 224/310, 224/311; 248/343, 323, 324, 278.1
See application file for complete search history.

(56) References Cited

U.S. PATENT DOCUMENTS

| | | | |
|---|---|---|---|
| 3,451,035 A | 6/1969 | Baldwin | 339/21 |
| 3,474,381 A | 10/1969 | Baldwin | 339/21 |
| 4,182,532 A | 1/1980 | Walker, Sr. | 296/137 |
| 4,836,478 A | 6/1989 | Sweere | 248/1 |
| 5,016,934 A * | 5/1991 | Pelz | 296/214 |
| 5,180,089 A | 1/1993 | Suman et al. | 224/42.45 |
| 5,599,086 A | 2/1997 | Dutta | 362/74 |
| 5,650,929 A | 7/1997 | Potter et al. | 364/423.098 |
| 5,775,762 A * | 7/1998 | Vitito | 296/37.7 |
| 6,203,088 B1 | 3/2001 | Fernandez et al. | 296/37.8 |
| 6,304,173 B2 | 10/2001 | Pala et al. | 340/461 |
| 6,338,517 B1 | 1/2002 | Canni et al. | 296/37.8 |
| 6,364,390 B1 * | 4/2002 | Finneman | 296/37.7 |
| 6,419,379 B1 | 7/2002 | Hulse | 362/488 |
| 6,575,528 B2 | 6/2003 | Tiesler et al. | 296/214 |
| 6,608,399 B2 | 8/2003 | McConnell et al. | 307/10.1 |
| 6,619,716 B1 * | 9/2003 | Sturt | 296/37.8 |
| 6,669,260 B2 | 12/2003 | Clark et al. | 296/37.8 |
| 6,678,892 B1 * | 1/2004 | Lavelle et al. | 725/75 |

(Continued)

FOREIGN PATENT DOCUMENTS

EP    0510541 A1    10/1992

(Continued)

OTHER PUBLICATIONS

International Search Report and Written Opinion of the International Searching Authority for International Application No. PCT/US05/30347, International Filing Date of Aug. 25, 2005.

*Primary Examiner*—David Ometz
*Assistant Examiner*—Jean W Désir
(74) *Attorney, Agent, or Firm*—F. Chau & Associates, LLC (57) ABSTRACT

A rail system for use in a vehicle comprises a rail mounted to an overhead portion of the vehicle, wherein the rail includes at least one track electrically connected to a vehicle power supply and at least one other track electrically connected to a media source, a support member removably mounted to the rail, and a console coupled to the support member, wherein the console is electrically connected to the at least one track for receiving power from the vehicle power supply and to the at least one other track for receiving data from the media source.

38 Claims, 5 Drawing Sheets

U.S. PATENT DOCUMENTS

| | | | |
|---|---|---|---|
| 6,824,185 B2 * | 11/2004 | Tiesler et al. | 296/37.8 |
| 6,926,333 B2 * | 8/2005 | Sturt | 296/37.8 |
| D512,973 S * | 12/2005 | Schedivy | D14/132 |
| 7,052,068 B2 * | 5/2006 | Sturt et al. | 296/37.7 |
| 7,084,932 B1 * | 8/2006 | Mathias et al. | 348/837 |
| 7,090,186 B2 * | 8/2006 | Quinno et al. | 248/324 |
| 7,097,225 B2 * | 8/2006 | Huisingh et al. | 296/37.7 |
| 7,136,115 B2 * | 11/2006 | Chen | 348/837 |
| 7,182,383 B2 * | 2/2007 | Anderson et al. | 296/37.8 |
| 7,219,942 B2 * | 5/2007 | Schedivy | 296/37.7 |
| 2002/0140289 A1 | 10/2002 | McConnell et al. | 307/10.1 |
| 2002/0149708 A1 * | 10/2002 | Nagata et al. | 348/837 |
| 2002/0163219 A1 | 11/2002 | Clark et al. | 296/37.8 |
| 2003/0075955 A1 | 4/2003 | Tiesler et al. | 296/214 |
| 2003/0127878 A1 | 7/2003 | Gort et al. | 296/37.8 |
| 2003/0168875 A1 | 9/2003 | Anderson et al. | 296/37.8 |
| 2004/0061358 A1 | 4/2004 | Vishey et al. | 296/214 |

FOREIGN PATENT DOCUMENTS

| | | |
|---|---|---|
| EP | 1391349 A1 | 2/2004 |
| WO | WO 02/087924 A1 | 11/2002 |

\* cited by examiner

RAIL SYSTEM FOR USE IN A VEHICLE

BACKGROUND OF THE INVENTION

1. Technical Field

The present disclosure relates to a rail system for use in a vehicle, and more particularly to rail system capable of providing power and audio and visual data to removably mounted consoles.

2. Discussion of the Related Art

Entertainment consoles mounted in vehicles provide video and audio entertainment to passengers therein. Some known designs of consoles include a screen for displaying video and a media source, such as a video cassette player (VCP) or a digital video disc (DVD) player.

Known consoles are positioned in a specific location in a vehicle and are limited in number and with respect to the variety of locations where they may be placed in a vehicle. Further, installation of a console can be a time consuming process to wire and mount the console to the vehicle, so that the number of consoles installed in a vehicle is often limited to one or two.

Accordingly, a need exists for a system that allows for multiple consoles to be removably installed in a vehicle and for consoles to easily be mounted at different positions in the vehicle.

SUMMARY OF THE INVENTION

A rail system for use in a vehicle, in accordance with an embodiment of the present invention, comprises a rail mounted to an overhead portion of the vehicle, wherein the rail includes at least one track electrically connected to a vehicle power supply and at least one other track electrically connected to a media source, a support member removably mounted to the rail, and a console coupled to the support member, wherein the console is electrically connected to the at least one track for receiving power from the vehicle power supply and to the at least one other track for receiving data from the media source.

The media source may include at least one of a television tuner, a videocassette player, a digital videodisc player, a compact disc player, a video compact disc player, an AM/FM radio, a satellite radio, a video game player, and a digital video recorder. The rail may be electrically connected to a ground connection and the console may be electrically connected to the ground connection through an electrical connection to the rail. The data from the media source may include at least one of an audio signal and a video signal.

The support member may include a connector electrically connected to the console, and the connector may include at least one contact positioned on the at least one track for receiving the power and at least one other contact positioned on the at least one other track for receiving the data. The rail may include at least a third track on which the connector is positioned. The connector may be electrically connected to the console. The support member may include an element for engaging the console to fix the console to the support member at a plurality of angles.

The console may be a video display device for displaying a video program received from the media source. The video display device may include one of a liquid crystal display and an organic electroluminescent display. The console may include a media player, a plurality of audio and video output ports for distributing at least one of audio data and video data received from the media source, a plurality of audio and video input ports for receiving at least one of audio data and video data from the media source, and/or a wireless transmitter for wirelessly transmitting at least one of audio data and video data received from the media source to a receiver. The media source may include at least one of a vehicle global positioning system providing position information to the console and a vehicle computer providing vehicle information to the console.

A rail system for use in a vehicle, in accordance with an embodiment of the present invention, comprises a rail mounted to an overhead portion of the vehicle, wherein the rail includes at least one track electrically connected to a vehicle power supply and at least one other track electrically connected to a media source, a support member removably mounted to the rail, and a video display console coupled to the support member, wherein the video display console is electrically connected to the at least one track for receiving power from the vehicle power supply and to the at least one other track for receiving at least one of audio and video data from the media source.

A rail system for use in a vehicle, in accordance with an embodiment of the present invention, comprises a rail mounted to an overhead portion of the vehicle, wherein the rail includes at least one track electrically connected to a vehicle power supply, a support member removably mounted to the rail, and a storage console coupled to the support member and electrically connected to the at least one track for receiving power from the vehicle power supply, wherein the storage console includes a compartment and at least one light powered by the power received from the vehicle power supply.

A door may cover the compartment, wherein the at least one light is activated when the door is opened. The at least one light may be positioned in the compartment. The at least one light may be activated when a vehicle door is opened. The support member may include a connector positioned on and electrically connected to the at least one track. The rail may include at least one other track electrically connected to ground, and the connector may be positioned on and electrically connected to the at least one other track. The connector may be electrically connected to the storage console.

BRIEF DESCRIPTION OF THE DRAWINGS

Preferred embodiments of the invention can be understood in more detail from the following descriptions taken in conjunction with the accompanying drawings in which.

DETAILED DESCRIPTION OF THE PREFERRED EMBODIMENTS

Preferred embodiments of the present invention will be described below in more detail with reference to the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1A:
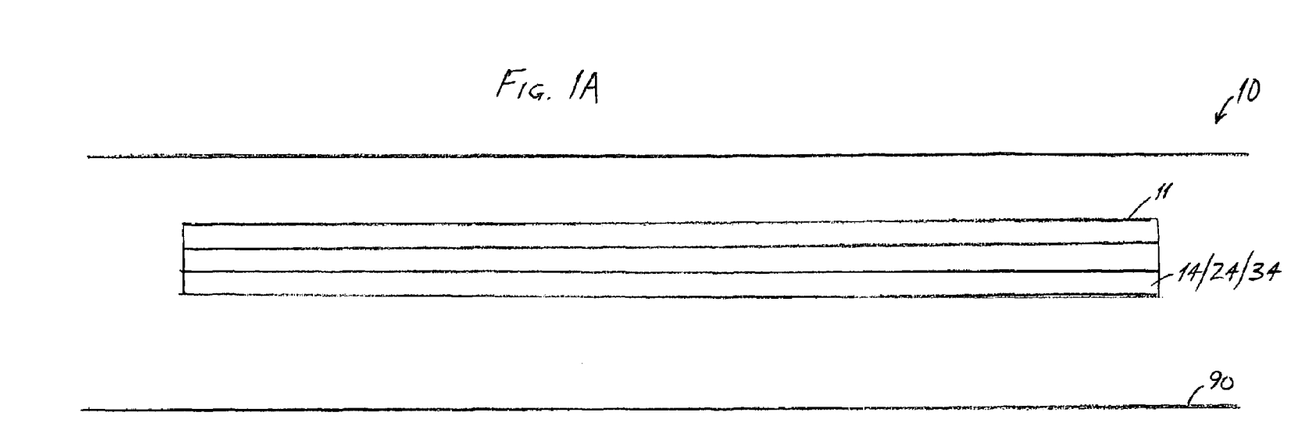
FIG. 1A is a bottom view of a rail mounted in a vehicle, according to an embodiment of the present invention.
Figure 1B:
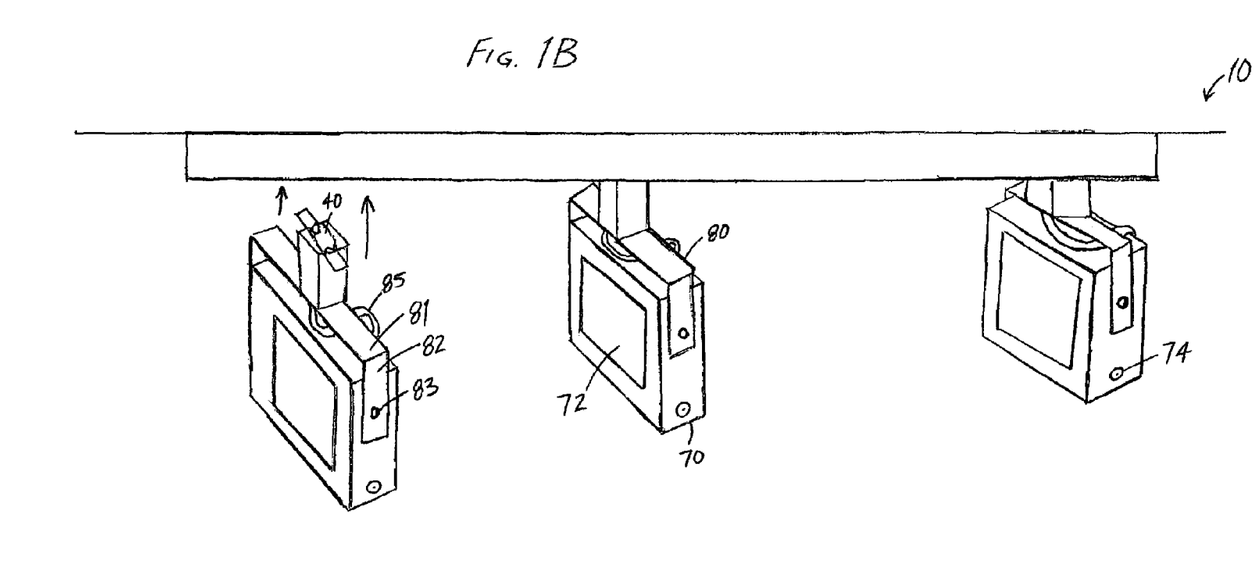
FIG. 1B is a side view of a rail system including display consoles mountable thereon, according to an embodiment of the present invention.

Referring to FIGS. 1A and 1B, a rail system 10 is shown, which includes a rail 11 attached to a portion of a vehicle, such as a vehicle ceiling 90. The rail 11 is mounted to the vehicle ceiling 90 with screws or other fasteners known to one of ordinary skill in the art that are capable of securing the rail 11 to the vehicle ceiling 90 so that the rail 11 supports the weight of multiple consoles 70 including support members 80 mounted thereto. Attachment of the rail 11 may be to the vehicle roof and/or to the vehicle headliner. The rail 11 may include, for example, lightweight aluminum, steel and/or plastic material.

It is to be appreciated that the rail 11 may be mounted in different orientations and/or locations in a vehicle. For example, the rail 11 may run from the front to back or from left to right sides of a vehicle, or at any angle in between such orientations. In addition, more than one rail 11 may be installed in a vehicle, such that two rails 11 are installed side by side in parallel, in line, or at a specific angle with respect to each other (e.g. 90 degrees).

Figure 1C:
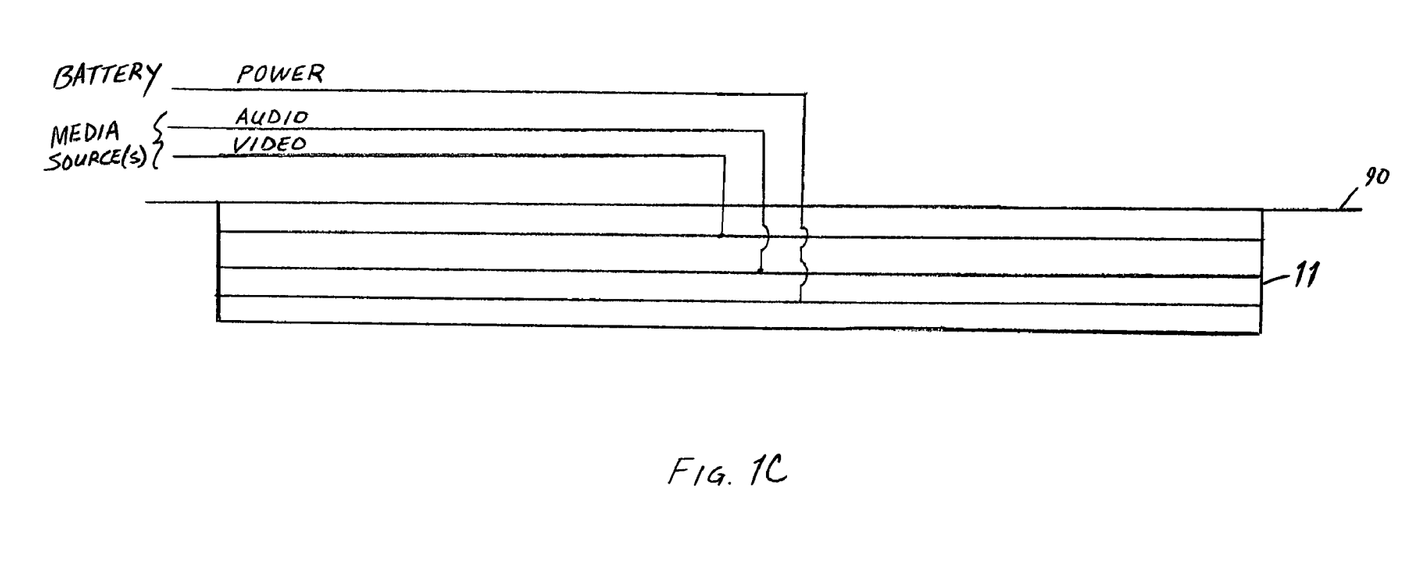
FIG. 1C is a schematic view of electrical connections to the rail system, according to an embodiment of the present invention.

As shown in FIG. 1C, the rail 11 is electrically connected to a vehicle's electrical system, including a power supply, such as a battery, to provide power to consoles mounted thereon. Further, through additional wired connections, the rail 11 receives audio and video from audio and video sources in the vehicle. For example, the vehicle may include a media player, such as a DVD player that is electrically connected to the rail to provide audio and video to consoles mounted on the rail. In addition, the audio and video leads to the rail may be connected to an antenna and a receiver of the vehicle, such as a TV tuner, AM/FM or satellite radio, capable of receiving audio and/or video from an external source.

The vehicle may include multiple media sources providing a passenger with a choice of programming. For example, media sources may include a TV tuner, a video cassette player (VCP), a DVD player, a CD player, video CD (VCD) player, an AM/FM radio, satellite radio, a video game player, and a digital video recorder (DVR). The console may include a bus for receiving audio and video signals or separate buses for receiving the audio and video signals. Programs may be selected via a selector or multiplexer on the console 70 and/or via a selector or multiplexer connected to the rail and/or to the multiple media sources.

Additional connections to the rail 11 may include connections to a vehicle global positioning system (GPS) for the provision of geographical information (e.g., heading and location) to the console 70 via the rail 11, a connection to a vehicle computer for the provision of vehicle information (e.g., temperature, oil pressure, fluid levels) to the console 70 and a connection to ground. In an embodiment, the connections may run from a vehicle's wiring harness.

Figure 2A:
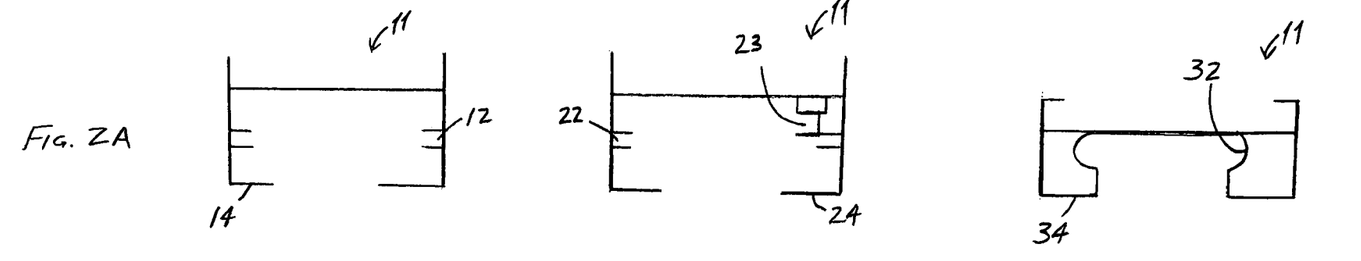
FIG. 2A shows cross-sectional views of different rail configurations, according to an embodiment of the present invention.

As shown in FIG. 2A, the rail 11 may have different configurations for providing the electrical connectivity and support to the consoles 70. For example, the rail 11 may include conductive tracks 12, 22, 23, and 32 that are wired to, for example, the power, audio and video sources to provide power, audio and video to connectors 40, 50, or 60 which, in turn, are electrically connected to the consoles 70. One of the tracks 12, 22, 23, 32 may be wired to a ground connection to ground a console mounted on the rail.

Figure 2B:
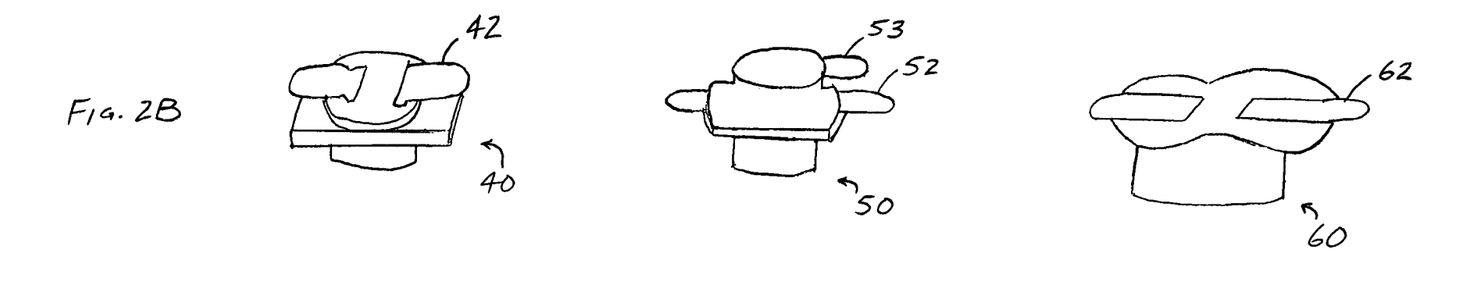
FIG. 2B shows connectors for use with the rails in FIG. 2A, according to an embodiment of the present invention.

The connectors 40, 50, and 60 include, for example, electrical contacts 42, 52, 53, and 62, which, respectively fit in tracks 12, 22, 23 and 32 to receive a combination of power and data and to structurally mount the support member 80 to the rail 11. As shown in FIG. 1B, the connectors, for example connector 40, are positioned on the support member 80 and wired to the console 70 through wire(s) 85. It is to be understood that the configuration and number of tracks and contacts may vary depending on the type of connector used, the desired connections, the number of media sources and the data and power being transmitted.

As shown in FIGS. 1A and 2A, the rail 11 includes an L-shape configuration 14/24/34 on left and right sides forming a track for supporting a connector 40, 50, or 60 positioned therein.

As shown in FIG. 1B, the support member 80 includes horizontal and vertical arms 81, 82 forming a U-shaped support to wrap around the console 70. The support member 80 also includes an adjustable element 83 on each arm 82, which engages the console 70 to support the console thereon. The adjustable elements 83 can be loosened and tightened to position the console 70 at a desired angle along the horizontal axis. In an embodiment two adjustable elements 83 engage each side of the console 70 through each arm 82. In an alternative embodiment, one adjustable element 83 is positioned through a hole in a left arm 82 and on a left side of the console 70 and exits through a hole in the right side of the console 70 and right arm 82 to support the console between the left and right arms. The adjustable element(s) 83 can be, for example a screw and nut combination, or other threaded mechanism capable of being tightened or loosened to adjust the angle of console 70 or to permit different consoles to be positioned on the support member 80. In the alternative, the console 70 may be attached to an element(s), which is permanently fixed in one position between the arms 82.

The support member 80 includes a connector 40, 50 or 60 (connector 40 is shown in FIG. 1B) positioned thereon to mount the support member 80 on the rail 11 and to provide the power and data from the rail 11 to the console 70 via wire(s) 85.

Referring to FIGS. 1B and 3-5, examples of different consoles are shown. For example, FIG. 1B shows console 70, which includes a display screen 72, such as, for example, a liquid crystal display (LCD) screen or an Organic Electro Luminescent Display (OELD) screen, for displaying a video program received from a media source located in the vehicle or external to the vehicle. Audio accompanying the video program or an audio only program may be played through the vehicle's sound system, a speaker (not shown) on the console 70, or through headphones from a headphone port 74 on the console 70. FIG. 3B shows a console 170 similar to the console 70, including a display screen 172 and a headphone port 174. The console 170 includes holes 173 on each side of the console 170 for engaging the adjustable element(s) 83 and a hole 175 on the rear side thereof for receiving wire(s) 85 carrying power and data to the console 170. As stated previously, the console 170 may include a bus for receiving audio and video signals or separate buses for receiving the audio and video signals from the rail 11.

Figure 3:
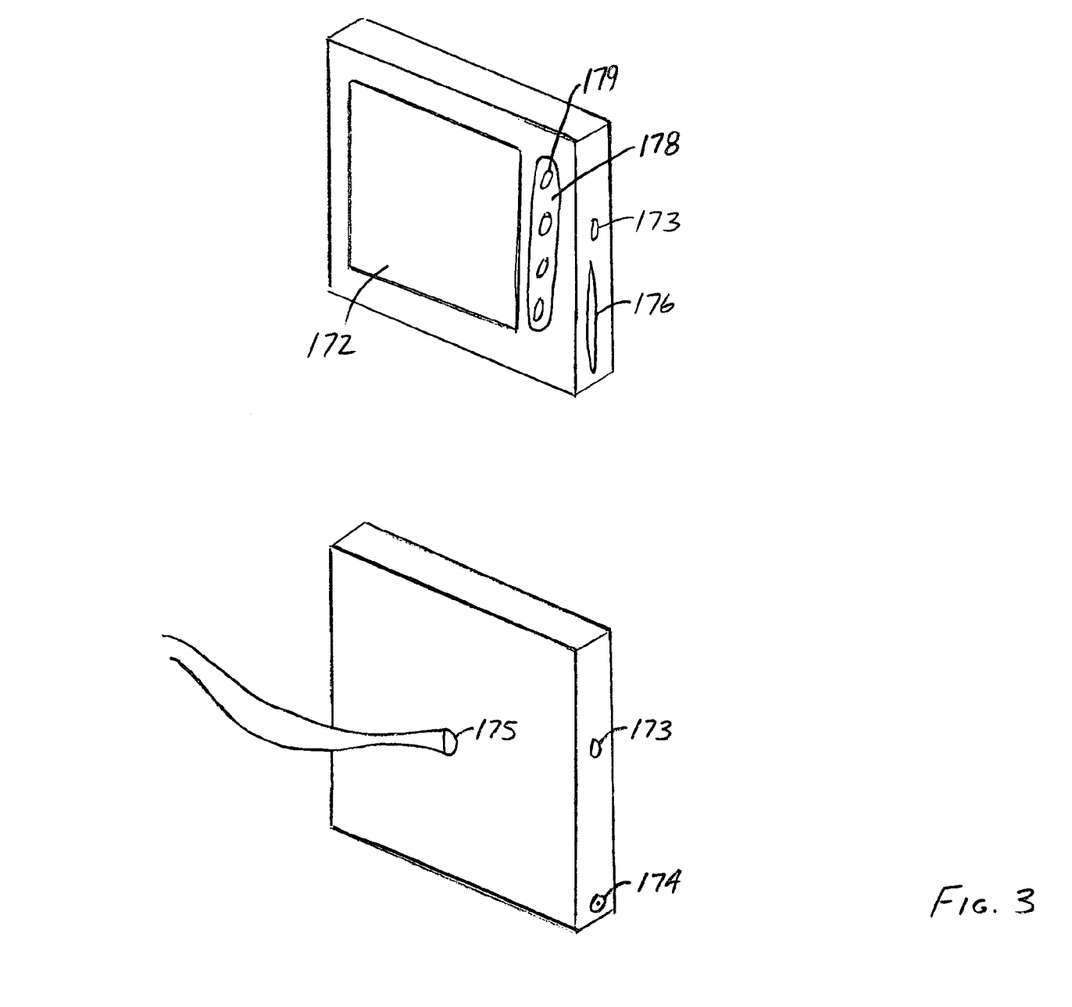
FIG. 3 shows perspective views of a display console connectable to the rail system, according to an embodiment of the present invention.

Unlike the console 70, the console 170 includes a media player incorporated therein, wherein a media storage medium, such as a DVD, can be inserted into the media player through slot 176 to be played on the media player and displayed on screen 172. The console includes control panel 178 with control buttons 179 for controlling, for example, display characteristics (e.g., brightness, contrast), volume, power on/off, selection of a media source (e.g., controlling a multiplexer), and functions of a media player (e.g., play, stop, pause, fast forward, rewind).

Figure 4:
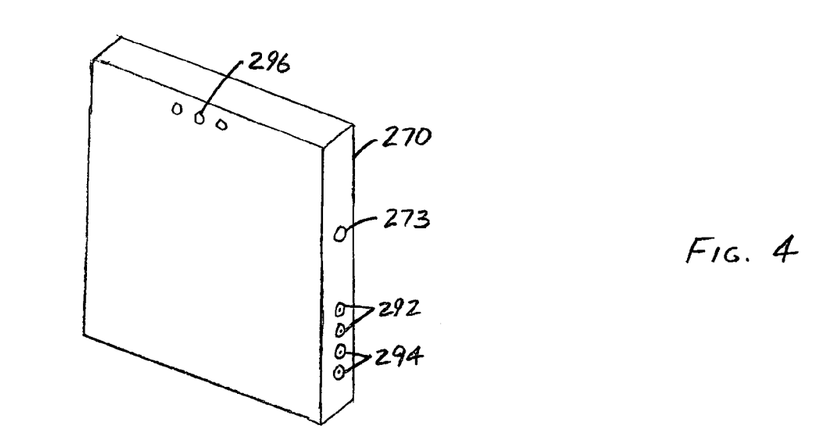
FIG. 4 shows a perspective view of a signal distribution console connectable to the rail system, according to an embodiment of the present invention.

Referring to FIG. 4, a signal distribution console 270 is attachable to the support member 80 via adjustable element(s) 83 inserted through holes 273. Like the consoles 70 and 170, the signal distribution console 270 receives power and data from the rail 11 via a connector 40, 50 or 60 and, in turn, through wire(s) 85 connected to the signal distribution console 270. The signal distribution console 270 includes audio and video input ports 292 to which an input jack carrying audio and video running from the rail 11 (e.g., included with a cluster of wires 85) can be connected. The audio and video input ports 292 are also connectable directly to a media source, for example, a portable media source, such as a handheld DVD player. The signal distribution console 270 also includes audio and video output ports 294 for connecting to a display, headphones, or any other available video screen or source component. Audio output ports may be used for connecting to an FM modulator for transmission of modulated audio signals to a vehicle radio. It is to be understood that the number and location of the audio and video input and output ports can be varied.

Like the signal distribution console 270, the consoles 70 and 170 may also include audio and video input and output ports. For example, the consoles 70 and 170 may receive audio and video through the audio and video input ports from, for example, the rail 11 or signal distribution console 270 and may redistribute the audio and video via output ports to, for example, other consoles, displays and/or headphones.

The signal distribution console also includes wireless transmitters 296 for wirelessly transmitting audio and/or video signals associated with audio and/or video programs to receivers located in, for example, displays and headphones. The wireless transmitters may be, for example, infrared (IR) transmitters (including, for example, an optical transmitting device) or radio frequency (RF) transmitters (including, for example, an antenna). The consoles 70 and 170 also may include wireless transmitters.

Figure 5:
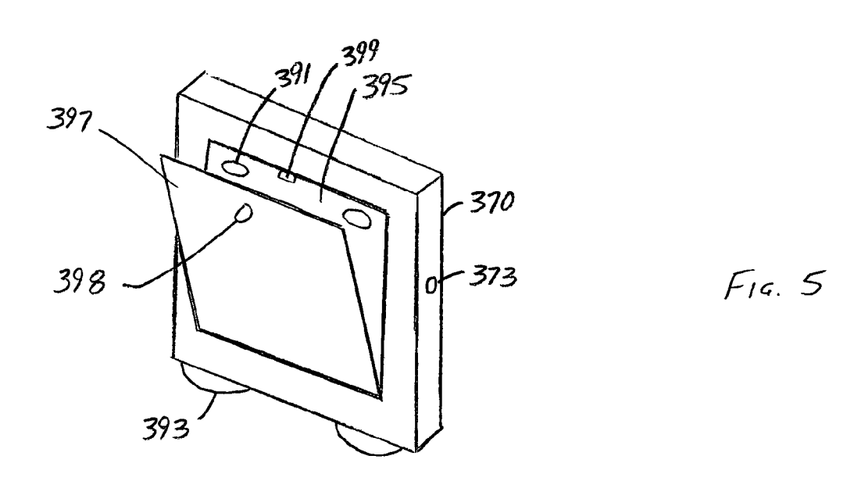
FIG. 5 shows a storage console connectable to the rail system, according to an embodiment of the present invention.

Referring to FIG. 5, a storage console 370 is shown. Like the consoles 70, 170 and 270, the storage console includes holes 373 for receiving element(s) 83 for attaching the console 370 to the support member 80. The storage console 370 includes a compartment 395 that can be accessed by opening a door 397 covering the compartment 395. The door includes a knob 398, which can be pulled to open the door. A locking member 399, such as, for example, a magnetic fastener, is positioned on the storage console 370 to fasten the door in place when in the closed position. The storage console 370 includes lights 391 for lighting up the compartment 395 and lights 393 for lighting up a vehicle interior. The lights 391 and 393 receive power from the rail 11 via wire(s) 85 connected to the storage console 370. The lights 391, 393 may be controlled via a switch on the storage console 370. The lights may also be triggered upon the opening of doors. For example, the lights 391 can turn on when the door 397 is in the open position and the lights 393 can turn on when the vehicle door is the open position.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A rail system for use in a vehicle, comprising:
   a rail mounted to an overhead portion of the vehicle, wherein the rail includes:
      a first side formed in an L-shape;
      a second side positioned opposite the first side and formed in an L-shape;
      at least one track positioned on the first side and electrically connected to a vehicle power supply; and
      at least one other track positioned on the second side and electrically connected to a media source;
   a support member removably mounted to the rail, wherein the support member includes a connector, the connector including:
      a first electrical contact engaging the at least one track; and
      a second electrical contact engaging the at least one other track; and
   a console coupled to the support member, wherein the console is electrically connected to the at least one track for receiving power from tie vehicle power supply and to the at least one other track for receiving data from the media source.

2. The rail system as recited in claim 1, wherein the media source includes at least one of a television tuner, a videocassette player, a digital videodisc player, a compact disc player, a video compact disc player, an AM/FM radio, a satellite radio, a video game player, and a digital video recorder.

3. The rail system as recited in claim 1, wherein the rail is electrically connected to a ground connection and the console is electrically connected to the ground connection through an electrical connection to the rail.

4. The rail system as recited in claim 1, wherein the data from the media source includes at least one of an audio signal and a video signal.

5. The rail system as recited in claim 1, wherein:
   the connector is electrically connected to the console; and
   the first electrical contact receives the power and the second electrical contact receives the data.

6. The rail system as recited in claim 1, wherein the rail includes at least a third track positioned on one of the first and second sides, and the connector includes a third electrical contact engaging the third track.

7. The rail system as recited in claim 1, wherein the connector is electrically connected to the console.

8. The rail system as recited in claim 1, wherein the support member includes an element for engaging the console to fix the console to the support member at a plurality of angles.

9. The rail system as recited in claim 1, wherein the console is a video display device for displaying a video program received from the media source.

10. The rail system as recited in claim 9, wherein the video display device includes one of a liquid crystal display and an organic electroluminescent display.

11. The rail system as recited in claim 9, wherein the console includes a media player.

12. The rail system as recited in claim 1, wherein the console includes a plurality of audio and video output ports for distributing at least one of audio data and video data received from the media source.

13. The rail system as recited in claim 1, wherein the console includes a plurality of audio and video input ports for receiving at least one of audio data and video data from the media source.

14. The rail system as recited in claim 1, wherein the console includes a wireless transmitter for wirelessly transmitting at least one of audio data and video data received from the media source to a receiver.

15. The rail system as recited in claim 1, wherein the media source includes at least one of a vehicle global positioning system providing position information to the console and a vehicle computer providing vehicle information to the console.

16. The rail system as recited in claim 1, wherein the connector further includes a base positioned under the first and second electrical contacts, wherein the base fits in the rail between the tracks and horizontal portions of the L-shapes of the first and second sides.

17. A rail system for use in a vehicle, comprising:
a rail mounted to an overhead portion of the vehicle, wherein the rail includes:
a first side formed in an L-shape;
a second side positioned opposite the first side and formed in an L-shape;
at least one track positioned on the first side and electrically connected to a vehicle power supply; and
at least one other track positioned on the second side and electrically connected to a media source;
a support member removably mounted to the rail, wherein the support member includes a connector, the connector including:
a first electrical contact engaging the at least one track; and
a second electrical contact engaging the at least one other track; and
a video display console coupled to the support member, wherein the video display console is electrically connected to the at least one track for receiving power from the vehicle power supply and to the at least one other track for receiving at least one of audio and video data from the media source.

18. The rail system as recited in claim 17, wherein the media source includes at least one of a television tuner, a videocassette player, a digital videodisc player, a compact disc player, a video compact disc player, an AM/FM radio, a satellite radio, a video game player, and a digital video recorder.

19. The rail system as recited in claim 17, wherein the rail is electrically connected to a ground connection and the video display console is electrically connected to the ground connection through an electrical connection to the rail.

20. The rail system as recited in claim 17, wherein:
the connector is electrically connected to the video display console; and
the first electrical contact receives the power and the second electrical contact receives at least one of the audio and video data.

21. The rail system as recited in claim 17, wherein the rail includes at least a third track positioned on one of the first and second sides, and the connector includes a third electrical contact engaging the third track.

22. The rail system as recited in claim 17, wherein the connector is electrically connected to the video display console.

23. The rail system as recited in claim 17, wherein the support member includes an element for engaging the video display console to fix the video display console to the support member at a plurality of angles.

24. The rail system as recited in claim 17, wherein the video display console displays a video program received from the media source.

25. The rail system as recited in claim 17, wherein the video display console includes one of a liquid crystal display and an organic electroluminescent display.

26. The rail system as recited in claim 17, wherein the video display console includes a media player.

27. The rail system as recited in claim 17, wherein the video display console includes a plurality of audio and video output ports for distributing at least one of the audio and video data received from the media source.

28. The rail system as recited in claim 17, wherein the video display console includes a plurality of audio and video input ports for receiving at least one of the audio and video data from the media source.

29. The rail system as recited in claim 17, wherein the video display console includes a wireless transmitter for wirelessly transmitting at least one of the audio data and video data received from the media source to a receiver.

30. The rail system as recited in claim 17, wherein the media source includes at least one of a vehicle global positioning system providing position information to the console and a vehicle computer providing vehicle information to the video display console.

31. The rail system as recited in claim 17, wherein the connector further includes a base positioned under the first and second electrical contacts, wherein the base fits in the rail between the tracks and horizontal portions of the L-shapes of the first and second sides.

32. A rail system for use in a vehicle, comprising:
a rail mounted to an overhead portion of the vehicle, wherein the rail includes:
a first side formed in an L-shape;
a second side positioned opposite the first side and formed in an L-shape;
at least one track positioned on the first side and electrically connected to a vehicle power supply; and
at least one other track positioned on the second side and electrically conducting data from a media source;
a support member removably mounted to the rail, wherein the support member includes a connector, the connector including:
a first electrical contact engaging the at least one track; and
a second electrical contact engaging the at least one other track; and
a storage console coupled to the support member and electrically connected to the at least one track for receiving power from the vehicle power supply, wherein the storage console includes a compartment and at least one light powered by the power received from the vehicle power supply.

33. The rail system as recited in claim 32, further comprising a door covering the compartment, wherein the at least one light is activated when the door is opened.

34. The rail system as recited in claim 32, wherein the at least one light is positioned in the compartment.

35. The rail system as recited in claim 32, wherein the at least one light is activated when a vehicle door is opened.

36. The rail system as recited in claim 32, wherein the rail includes at least a third track positioned on one of the first and second sides and electrically connected to ground, and the connector includes a third electrical contact engaging the third track.

37. The rail system as recited in claim 32, wherein the connector is electrically connected to the storage console.

38. The rail system as recited in claim 32, wherein the connector further includes a base positioned under the first and second electrical contacts, wherein the base fits in the rail between the tracks and horizontal portions of the L-shapes of the first and second sides.

* * * * *